United States Patent
Legare

(10) Patent No.: US 6,686,003 B2
(45) Date of Patent: Feb. 3, 2004

(54) HIGH PERFORMANCE FIRE-PROTECTION CONTAINERS

(75) Inventor: David J. Legare, Ava, NY (US)

(73) Assignee: Fireking International, Inc., New Albany, NY (US)

( * ) Notice: Subject to any disclaimer, the term of this patent is extended or adjusted under 35 U.S.C. 154(b) by 0 days.

(21) Appl. No.: 09/862,023

(22) Filed: May 21, 2001

(65) Prior Publication Data

US 2001/0048985 A1 Dec. 6, 2001

Related U.S. Application Data

(63) Continuation of application No. 09/180,697, filed on Nov. 13, 1998, now abandoned.

(51) Int. Cl.[7] .............................. E05G 1/024; B32B 1/02
(52) U.S. Cl. .................... 428/34.4; 428/34.6; 428/920; 428/921; 220/560.01; 252/601
(58) Field of Search ................. 428/34.4, 34.6, 428/34.7, 35.7, 920, 921; 52/317, 396.01, 783.13, 784.11; 220/560.01; 312/409; 252/601, 605, 606, 607, 609

(56) References Cited

U.S. PATENT DOCUMENTS 4,064,317 A * 12/1977 Fukuba et al. ........... 428/537.7
4,384,894 A * 5/1983 Vickers et al. ............. 106/617
4,409,197 A * 10/1983 Sugano et al. ........... 252/186.1
4,574,454 A * 3/1986 Dyson ........................ 109/65
4,810,741 A * 3/1989 Kim ........................... 252/606
4,997,694 A * 3/1991 Legare ........................ 428/71

FOREIGN PATENT DOCUMENTS

EP  0222720 A2 * 10/1986
GB  1071485 A * 3/1981

* cited by examiner

Primary Examiner—Harold Pyon
Assistant Examiner—Alicia Chevalier
(74) Attorney, Agent, or Firm—George R. McGuire; Bond, Schoeneck & King, PLLC

(57) ABSTRACT

Fire and heat protective containers having two matable portions, the outer walls of which are formed as hollow shells filled with a ceramic gel material containing at least water glass and a polyvalent metal salt, preferably calcium chloride. For ensuring that stored articles are not exposed to temperatures greater than 125 degrees F., a layer of low-density, expended or foamed plastic insulation and a layer of phase change material are provided within the gel layer. A preferred phase change material is a mixture of water glass and a hydrated salt, preferably sodium phosphate, having a melting point around 120 degrees F. and a heat of fusion of at least 250 joules per gram. The phase change material is also contained in hollow shells, the walls of both the outer and inner shells being molded plastic parts.

3 Claims, 6 Drawing Sheets

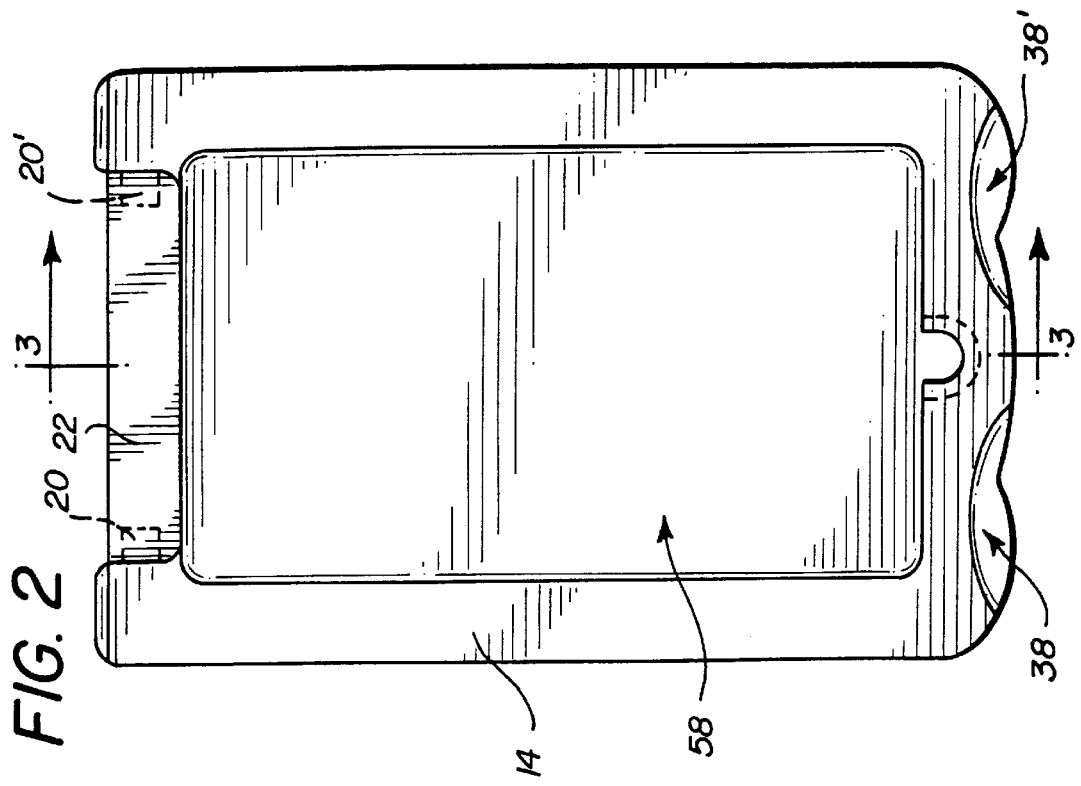
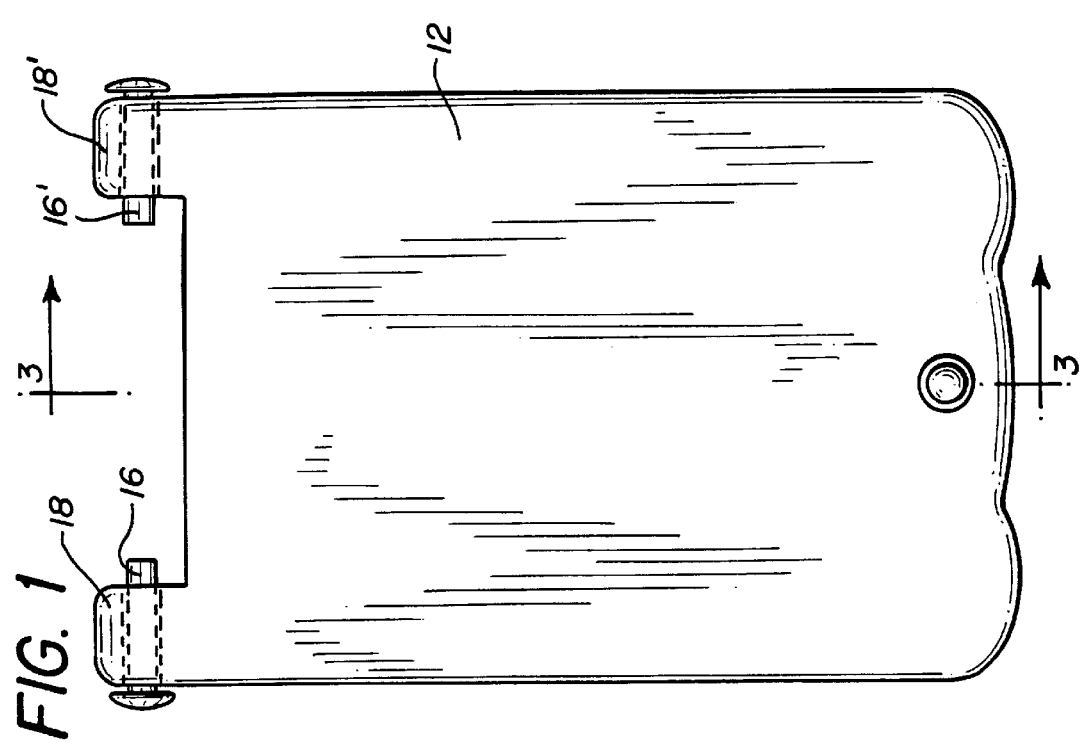

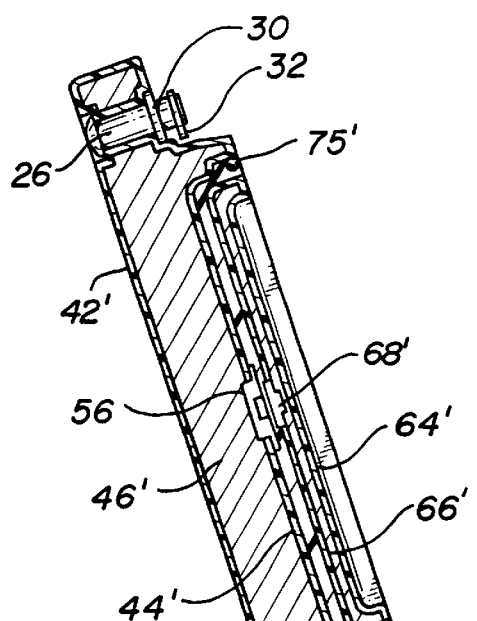
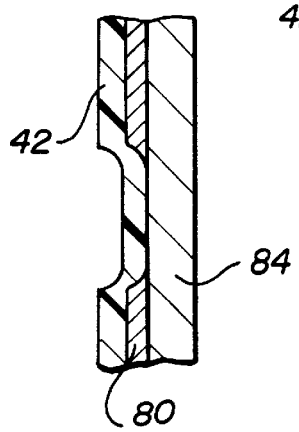
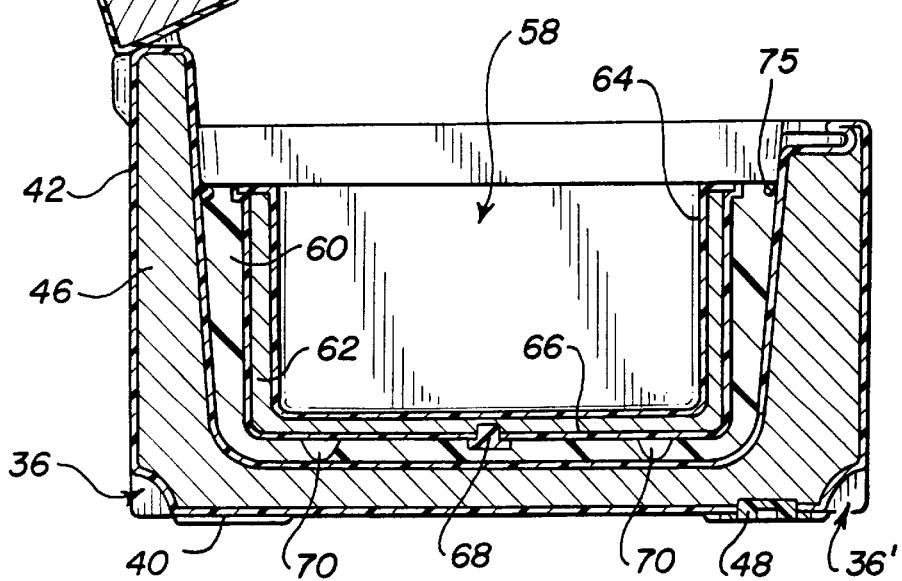

HIGH PERFORMANCE FIRE-PROTECTION CONTAINERS

This is a continuation of application Ser. No. 09/180,697, filed Nov. 13, 1998, now abandoned.

TECHNICAL FIELD

The present invention relates to fire-protection containers such as safes, storage boxes, filing cabinets, and the like, and to materials and methods of production thereof which optimize the desirable characteristics of such containers.

BACKGROUND ART

Fire protection containers generally comprise a double-walled box enclosure in which the space between the walls is filled with a heat dissipating material. This material is generally some type of cementitious product which has a high water content. By itself, this single water-bearing layer is usually sufficient for the protection of paper and similar items which can withstand temperatures between about 200 to 400 degrees F. However, electronic data storage media such as floppy disks and CD ROMS have a much lower heat tolerance and must be maintained at temperatures below 125 degrees F. Therefore, for such applications, one or more additional heat insulating and/or absorbing layers are added to the inside of the box. This usually comprises first a layer of high R-value foam such as polyurethane followed by a high heat capacity phase change material which has a melting point below 125 degrees F.

The prior art describes a number of structural designs for the box shell used to contain the outside insulation layer, typically made from steel or plastic. The steel shell has the obvious advantage of providing additional protection from the physical shock which could occur from a fall during the fire. However, the plastic shell provides a lighter, less expensive product which is much easier to manufacture. Numerous fire protective safe designs have emerged during the past several years. In particular, a number of designs employing a plastic shell have been introduced. These include the structures disclosed in U.S. Pat. Nos. 4,541,545, 4,048,926, Des.289,582, 4,683,732, and 5,377,514. Other general protective fire safe designs are disclosed in U.S. Pat. Nos. 4,574,454, 3,888,557, 4,893,397, and 4,685,402, for example.

The prior art also describes a number of methods of forming solid or gelled compositions from solutions of a soluble silicate such as sodium or potassium silicate. These materials generally possess the property of being able to absorb and dissipate large quantities of heat when exposed to fire and high temperatures due to their inherent high water content. When properly formulated to withstand temperatures exceeding 1700 degrees F., these materials also have utility in the area of fire-protection containers, in which they are sandwiched between walls of the container as a heat and fire protection layer. The prior art contains numerous references to gelled silicates for applications ranging from construction, insulation and fire protection materials to soil hardeners. Examples of the former categories are presented in U.S. Pat. Nos. 4,871,694, and 4,997,694. A less typical example for the use of gelled silicates is in the production of microwave absorbing materials (e.g., U.S. Pat. No. 4,806,718) for use in microwave cooking products, for example. The prior mentioned U.S. Pat. No. 4,997,694 also discloses a fire and heat protective gel material formed by polymerization reaction of sodium or potassium silicate and a salt of a monovalent alkali metal. This material exhibits intumescence upon application of heat, a property which may be desirable in certain applications, but undesirable in others.

Certain soil hardeners also employ the addition of a polyvalent metal salt (such as calcium chloride) to cause gelling of the soluble silicate (e.g., sodium silicate solution). Examples of these soil hardening techniques are described in U.S. Pat. Nos. 4,056,937 and 4,466,831. The addition of polyvalent metal salts to sodium silicate in the production of soil hardeners is also mentioned to a lesser extent in U.S. Pat. Nos. 4,354,875 and 4,384,894. However, such materials have heretofore not been considered for use in connection with fire or heat protective enclosures.

Current methods used by the fire-protection industry for the production of fire/heat-proof containers such as fireproof filing cabinets and safes primarily utilize the principal of water liberation from a hydrated composition such as concrete or gypsum to absorb the external heat and liberate it via steam ablation from the material to maintain a safe temperature inside the container. Since these insulation materials generally weaken and crumble (like cement when the water is baked out) they have to be included between heavy gauge metal walls to provide and maintain structural integrity during and after a fire. This tends to make the product fairly heavy and expensive. As stated before, some commercial fire-protection containers using these types of cementitious insulation materials are provided only with plastic walls which burn away during a fire leaving the exposed insulation. Although the insulation will remain intact if undisturbed, even a slight impact or fall experienced by the fire-exposed container could cause the insulation layer to crumble or shatter, thus compromising its contents to the fire.

Objects of Invention

It is a principal object of the present invention to produce a low cost, easily manufacturable, light-weight fire protection container which is highly effective under realistic fire conditions.

An additional, important object is to provide a storage container which has superior fire protection qualities, as well as the ability to retain its basic structural integrity after prolonged exposure to high temperatures as experienced during a fire.

A further object is to provide a fire protection container which will effectively ensure the integrity of contents which cannot withstand temperatures higher than about 125 degrees F., including articles bearing magnetically recorded data.

Still further objects are concerned with novel and improved methods of fabricating fire protection containers and materials used in the fabrication of such containers.

Other objects will in part be obvious and will in part appear hereinafter.

Disclosure of Invention

The present invention discloses a specific set of gelled silicate materials which provide several advantages over the prior art insulations used for fire-protection containers, specifically cementitious materials such as concrete and gypsum. These advantages include a higher heat duration for a given wall thickness, and an increase in material strength after intense heating. The first of these is the result of numerous factors including a higher water density and the inherent high R-value of the porous silica layer that forms as the insulation is baked out. The second results from the fact that the silicate gel is actually an unfired ceramic which solidifies and toughens after being fired. By comparison, cementitious materials such as concrete and gypsum derive their physical strength from the chemically bound water which is integral to their crystalline structure. Once this water is driven off by heating, these materials weaken and crumble.

The silicate gel insulation layer of the present invention is generally formed by the combination of one or more polyvalent metal (preferably a Group II A metal, i.e., calcium, magnesium) salts (preferably halides), particularly calcium, magnesium, or aluminum chloride, and to a lesser extent, strantium, barium, zinc, or iron chloride, with a greater amount of an alkali metal silicate solution, particularly sodium silicate, having a silica to metal oxide ratio of two or higher. This combination forms a very dense, rigid material which contains over 50% water, has superior heat resistance and heat duration properties, and which retains or actually improves its structural integrity during fire exposure. It should also be noted that the gel material of the present invention remains essentially dimensionally stable upon application of heat, as opposed to the intumescing gel material of previously mentioned U.S. Pat. No. 4,997,694.

In one basic embodiment, the present invention includes the proposed new silicate gel insulation in combination with either a blow-molded or roto-molded plastic shell to provide an inexpensive, easily manufacturable product which performs well under realistic fire conditions wherein impact damage may threaten the structural integrity of the box. The superior heat duration properties of the insulation also allow the production of a very compact container with relatively thin walls. Thus, it can even be made small enough to fit inside a file drawer while still providing for adequate storage space inside. Other features that will be described include structural and design enhancements such as a conformal metal shell or internal wire mesh, molded-in lock and hinge portions, and also a unique phase change material which allows for a thinner box wall and lower manufacturing cost.

The present invention contemplates various configurations of fire-protection containers, each having at least two portions, such as a basic, bottom and side walled base and a lid or door, which are relatively moveable into mating engagement to define an enclosed storage space. Each portion of the container is comprised of at least one layer of high temperature silicate gel insulation preferably enclosed by a double-walled plastic or metal (or combination of the two) shell which is thin in relation to the thickness of the insulation layer. Other heat protection materials chosen to work at lower temperatures may be added in layered fashion starting at the inside surface of the shell enclosing the high temperature ceramic gel insulation. These could include light-weight plastic foams made from polyurethane or polystyrene to retard heat flow to the inside of the container. An additional layer of a heat absorbing material could also be included, preferably between the plastic foam layer and the container cavity space. This technique is particularly useful when it is desired to protect materials which are very sensitive to heat, such as magnetic storage media (computer discs/tapes) and optical cds. The internal heat absorbing layer is thus chosen to be a solid which possesses a high energy capacity in transforming to the liquid phase, and which melts at a temperature below the safety threshold of the box contents (around 100 to 120 degrees F.). A final plastic shell layer which covers the inside of the box is sufficient to contain the melted phase-change layer and isolate it away from the box contents.

The shell which forms the enclosure for the high temperature silicate gel insulation layer can be produced using any number of standard methods and materials. For example, the gel could be injected into a metal shell similar to those used by some existing commercial products. However, it would be best to first water-proof the inside of the metal shell with a plastic coating, for example, to prevent contact with the insulation, which contains dissolved salts which could be corrosive, especially to ferrous metals. A major advantage provided by the novel gel insulation, even using this traditional construction method, is that the retained structural rigidity of the insulation after heat exposure makes the box much more impact resistant than using the prior cementitious insulations, and allows the use of a thinner gauge metal for the shell. It is also noted that the porous ceramic resulting from the fired gel has excellent impact absorbing properties in that it tends to partially crush at the point of impact instead of fracturing.

When considering the design of a minimum cost product which provides superior performance to those in its class, a blow-molded plastic shell is contemplated. A similar, but usually more expensive product could be produced by roto-molding. However, the roto-molding process allows the production of more complex features, greater control of plastic wall thickness, and has a lower tooling cost. Roto-molding also has the desirable effect of causing a higher material thickness at the corners of the part (thus resulting in a more rigid part), as opposed to blow molding which causes the opposite effect. One other inexpensive alternative could be vacuum or compression forming the inner and outer shell sections and sealing them together at their peripheries to form the complete, hollow shell. However, this could result in some reliability problems resulting from moisture leakage from the insulation due to a bad seal. Other molding options such as injection molding are also possible.

Optional, structural enhancements to the plastic shell are also contemplated. The first of these is intended to be applied to the blow-molded shell, and envisions a composite plastic and metal shell formed by blow-molding the plastic layer over a preformed (preferably single piece of light-gauge, stamped) metal layer which fits conformally to one of the mold halves. The metal layer would preferably be included with a number of holes, slots, or other cut-out portions such that the plastic would fill these resulting spaces so that the outer surface of the shell is essentially planar with adjacent sections of exposed plastic and metal. Any metal finishing such as painting would be done prior to the plastic molding operation for simplicity of production. It is evident from the above that the metal hole patterning, along with metal/plastic texturing and coloring, could be chosen for optimum strength, weight minimization, and aesthetic appearance. The holes also obviously provide points at which steam and vaporizing plastic can escape during a fire to prevent pressure build-up on the inside surface of the metal shell. It can also be seen that separate metal layers could be included both on the inside and outside surfaces of each container portion, but would generally be most useful on the outer (heat-exposed) surface.

This concept of combined metal and plastic layers could also be applied to a roto-molded product. In this case, the metal shell itself would actually comprise part of the mold, along with the support structure required to hold the two mold halves together and any external mold sections needed to cover holes in the metal shell. Another option would be to simply slide the conformal metal shell over the pre-molded plastic shell. The metal shell could be held in place by a number of standard attachment means including screws or rivets anchored to blind holes molded into the plastic shell. A further enhancement to this concept could be to mold recessed areas into the plastic shell so that a layer of ceramic fiber blanket could be included between the metal shell and the plastic shell. The extremely high R-value of the ceramic blanket allows the use of a thinner layer of the heavy silicate gel insulation, and thus reduces the weight of the container.

A coating of material which exhibits intumescence when exposed to heat may be applied to the outer surface of the metal shell in place of surface or in addition to the ceramic blanket to create a low density, high R-value outer layer. Such a coating would be applied as an approximately 0.25 to 3 millimeter thick layer having the texture and durability of a typical paint or plastic film. This outer layer would form a thick, (up to about 5 to 25 times or more of starting thickness) low density carbon foam having a very high R-value and heat resistance, during fire exposure. This addition would provide for greater heat protection, or allow the use of a thinner silicate gel layer and/or ceramic fiber blanket layer while retaining the same level of heat protection. The above coating could be provided by a number of existing commercial products, but a novel preferred embodiment of this invention includes the combination of a commercial intumescent powder additive in equal volume with an uncured epoxy resin. The mixture is applied to the substrate and allowed to cure to a hard finish. The preferred intumescent powder additive is FRC-EX4 (particle size approximately 0.044 mm), a flame retardant intumescent additive produced by FRC Technologies, Inc. of Addison, Ill.

Another structural enhancement, particularly with a roto-molded shell, is the addition of a reinforcing layer of metal mesh (perforated sheet metal or wire mesh) to the inside of the mold so that the mesh is supported in the space between the shell walls upon completion of the molding operation. The protective layer must be sufficiently porous so as to not impede the flow of the plastic powder around the inside of the rotating mold during the roto-molding procedure. The perforated metal or mesh layer would first be cut and bent into the required shape and then attached to the mold by suitable support members at a minimum number of strategic locations to keep it suspended inside the mold cavity without touching the walls of the mold. Upon removal of the plastic shell from the mold, there would be a number of holes in at least one of the shell walls where the support members had been positioned. These holes would later have to be sealed to prevent moisture leakage after the shell is filled with insulation. This could be conveniently and effectively accomplished by spin-welding plastic plugs over the holes. This metal mesh layer would serve as a structural reinforcement to the ceramic gel insulation after it is poured into the shell, and may obviate the need for an outside reinforcing metal layer.

Additional features include the use of molded-in hand grip areas for opening and lifting the container, and molded-in hinge and lock areas. All of these are provided for the purpose of manufacturing cost reduction and to reduce the risk of moisture leakage that could occur from screws and rivets, that would otherwise be required to attach additional hardware to the plastic shell. Other possible design enhancements include one or more flexible rubber seals along the mating edges of the container portions (i.e., one each inside the lid and base of the container), placed towards the inside of the edge to minimize heat exposure, for keeping out smoke, moisture, and other contaminants during a fire. This seal would also defend the contents of the box against water exposure such as flooding, thus adding to the over-all protection capabilities of the product. The metal portion of the shell (if metal is used) or wire mesh, or possibly metal foil or a metallic coating to the surface of one of the inner plastic walls of the container could also provide EMI shielding for magnetic media.

Other features of the invention include design of the inner heat absorbing layers and novel phase change material formulations for the production of a container for storage of electronic media.

The most important consideration of the invention, however, is the discovery of the tremendous improvement offered by the use of the gelled silicate materials contemplated by the invention over the current state of the fire-protection container technology art. These insulation materials can be generally described as a solid silicate gel formed by the addition of a polyvalent metal salt, preferably a halide (gelling salt) to an alkali metal silicate solution wherein the silica to metal oxide ratio is preferably between about two to four. A common commercial grade of water glass (sodium silicate) having a silica to metal oxide ratio of about 3.25 and aqueous solution concentration of about 35 to 40 percent by weight works well. The gelling salt is preferably one or more of calcium, magnesium, or aluminum chloride (and to a lesser extent, iron and zinc chloride). A calcium chloride alone appears to work quite well, and is the least expensive to use. These salts may be added in either granular or aqueous solution form, or some combination thereof wherein the granular (slow reacting form) is mixed in first, followed by an additional, lesser quantity of the salt solution to complete the gelling reaction. The granular size can be adjusted to control reaction rate and material quality (i.e., homogeneity). In solution form, the salt(s) should normally be at or near saturation, with the more dilute form used to cause a slower reaction time. Of all the possible methods for producing a silicate gel, that described above provides a product with superior and unique properties, including an extremely high water retention after the gel is formed, and a very long bake-out time (time required to boil off the water from the solid under high heat exposure). Also, the steady-state temperature of the inside of a given volume of the material (which has not yet been baked out; still wet) never exceeds 220 degrees F. This is critically important to the protection of electronic data storage materials, since a high inner wall temperature requires thicker internal heat absorbing layers, which in turn forces larger outer dimensions and a heavier product. Another valuable property of the material is that it has a much higher density, up to twice that of other water-bearing insulation products, while also possessing a higher heat duration value per unit of weight. This obviously allows for thinner walls and smaller outside dimensions, as well as a lighter weight product. Other features of the material include a high melting point and a very low thermal mass of the porous baked-out gel (ceramic), and the high strength of both the wet gel, and especially the fired material.

Although the basic chemistry appears very straightforward, that being the reaction of the gelling salt with a portion of the soluble silicate to form a polyvalent metal silicate in the water glass matrix, the nature of the material itself is quite complex, and possibly has a great deal to do with the crystalline structure that occurs during the reaction and curing process. Thus, it has been observed that the materials should be mixed under low shear and allowed to set for several hours to allow for full material cure. Experiments in which the components were blended at high speed (i.e., above 1500 rpm) tended to produce gels which had a lower heat duration and lower structural integrity after fire exposure.

The amount of the polyvalent salt used should be such that it reacts with a significant part (preferably 20 to 100 percent)

of the soluble silicate in the water glass. This can be illustrated as follows using $CaCl_2$ as the polyvalent salt. It has been determined that a good quality gel sample is provided by the addition of about 7 ml of saturated calcium chloride solution (270 g $CaCl_2.H_2O$/250 g $H_2O$) to 80 g of a commercial water glass solution (about 36% by wt solids) in which the $SiO_2$ to $Na_2O$ ratio is about 3:2. It can be seen that the water glass solution comprises about 29 g solids which furthermore comprise about 24% or roughly 7 g $Na_2O$, the reactive component. Likewise, the calcium chloride solution can be seen to be comprised of about 4.3 g solids. Thus, the reaction between the gelling salt and the soluble silicate can be illustrated as follows: Considering the fact that the molecular weights of $Na_2O$ (62 g/mol) and $CaCl_2$ (60 g/mol) are about the same, their weight and molar ratios are approximately equal, and it can be also seen that they form a balanced reaction in a 1:1 molar ratio such that: $Na_2O+CaCl_2 \rightarrow 2\ NaCl+CaO$. Therefore, for this mixture, 4.3 g $CaCl_2$/7 g $Na_2O$ implies that the polyvalent salt reacted with approximately 60% of the soluble silicate in the water glass solution. Further experimentation has shown that this composition (after baking out to form a porous ceramic) has a melting point of around 1700 degrees F. The addition of a higher proportion of calcium chloride will increase this melting point to a peak of about 2000 degrees F. From this analysis, the required quantities of other polyvalent salts of the invention can also be deduced.

Other components can be added to the gel to provide improvements to the manufacturing process and/or enhance the performance of the final product. For example, it has been found that certain alkali metal (group IA) salts can be added to the water glass either prior to or in conjunction with the calcium chloride. These are added in quantities that are generally substantially less than (typically less than 20%) the amount of calcium chloride used, and have the effect of increasing the viscosity of the water glass (without causing solidification) and slowing the reaction between the water glass and the calcium chloride. Potassium salts, e.g., potassium acetate, are particularly useful in this regard. This effect can be used to increase the time available for pumping the silicate gel into the plastic shell wall of the fire-protection container and to help produce a more homogenous material. This effect is particularly useful when the calcium chloride is being added in solution form (at or near saturation) where it reacts very quickly with water glass. Such additives may also improve the structural integrity of the material. These materials are added either in solid (granular) or solution form.

Other optional additives include inert filler materials for improving the structural integrity of the gel and/or fired ceramic. These include glass or ceramic fibers, or granular components such as perlite or vermiculite. This type of reinforcement additive would generally comprise from about 1 to 5% (but no more than 10%) by weight of the water glass component in the gel. A specific example would be 5% of ¼ inch long 10 to 50 micron glass or ceramic fiber. A further improvement provided by such fillers is to lower the material density, and consequently the weight of the product, while maintaining its heat duration capacity. The trade-off here is in the improved R-value of the lower density fired outer layer of the insulation compared to the reduced water density, and consequent lowered heat absorption capacity of the material. Preliminary computer modelling indicates that a 20% weight reduction may thus be possible. Density reduction may be achieved by the addition of a light weight granular material or by the introduction of air or other gas via frothing of the gel before it solidifies. This could be done by frothing the water glass (to produce air bubbles on the order of 2 mm diameter or less) prior to addition of the calcium chloride, or other gelling agents. A proposed light weight filler material could be a foamed plastic such as expanded polystyrene or foamed polypropylene or polyethylene granules. The use of a plastic filler such as foamed polypropylene granules (or even plastic fibers) provides the additional advantage of improving the material's resistance to water exposure, e.g., from a building sprinkler system, or fire hose, after it has been partially exposed to fire. For example, after the outer plastic shell has burned away, the plastic filler tends to melt and soak into the porous ceramic layer that is formed as the insulation is baked out. The plastic should thus tend to form a continuous layer which progresses inwardly as the insulation becomes baked out, conformal to the boundary between the still-wet inner volume of the insulation and the outer, baked-out portion. This plastic layer should help to protect the structural integrity of the underlying insulation volume from the erosive effects of external water exposure. Other types of additive filler materials could consist of those which evaporate or burn away to absorb and dissipate heat from the fire. Wood particles could be particularly useful in this respect because they tend to leave behind a carbon char which has a very high R-value, and which may further improve the insulative qualities of the porous ceramic layer. The addition of a wood filler may also be a means of lowering the insulation density for overall weight reduction.

Depending upon the contemplated uses of the container, one or more additional protective layers may be provided internally of the ceramic gel layer. As previously mentioned, if the container is to be used for storage of materials which are subject to damage by exposure to temperatures above 125 degrees F., a layer of phase-change material is provided as an inner liner, surrounding the container cavity. As in the case of the outer, gel layer, the phase-change material is contained in a relatively flat, hollow, plastic shell. The phase-change material should preferably be a hydrated salt, wax (e.g., polyethylene glycol), etc. which changes between solid and liquid phases at a temperature between about 100 and 124 degrees F. with a heat of fusion of at least about 250 joules per gram. The preferred, novel material of the invention is a mixture of about 32 parts water, 16 parts water glass (30–40% solids), and 40 parts each sodium phosphate dibasic (anhydrous) and sodium phosphate tribasic (dodecahydrate), all parts being by weight.

The phase-change material is mixed as a slurry and injected into the hollow plastic shell through a fill hole. The term "injected," as used herein, encompasses pouring or any other means of placing a flowable material, e.g., the phase-change material and the ceramic gel material, into a hollow shell through a fill hole. Also, although the usually accepted chemical definition of "water glass" is an aqueous solution of sodium silicate, as used herein the term water glass is intended, for convenience, to encompass both sodium silicate and potassium silicate.

In containers which include an inner liner comprising a layer of phase change material in a hollow shell, an intermediate, thermal insulation layer is preferably provided. The material of the intermediate layer may be preformed in solid form, thus requiring no separate shell. Since materials such as urethane may expand upon heating, to the extent that they may crack the outer, ceramic gel layer, thus damaging its structural integrity, after it has been fired, a clearance space should be provided to allow for such expansion. This problem may also be averted by the aforementioned provision of a reinforcing metal layer and/or mesh layer within the gel layer.

BRIEF DESCRIPTION OF DRAWINGS

The features described above, and others, will be more fully understood and appreciated from the following detailed description, taken in conjunction with the accompanying drawings wherein:

FIG. 1 is a top plan view of the lid of one embodiment of the fire-protection container of the invention;

FIG. 2 is a top plan view of the base of the container;

FIGS. 3 and 4 are side elevational views of the assembled container (base and lid combined) in section on the lines 3—3 of FIGS. 1 and 2, with the lid in closed and open positions, respectively;

FIG. 5 is a fragmentary, perspective view of a portion of the outer shell wall of the container in which an optional, molded-in, metal shell has been included;

FIG. 5A is a side elevational view in section on the line 5A—5A of FIG. 5 and also showing a fragment of a mold wherein the container wall is formed;

MODES FOR CARRYING OUT THE INVENTION

Figure 3:
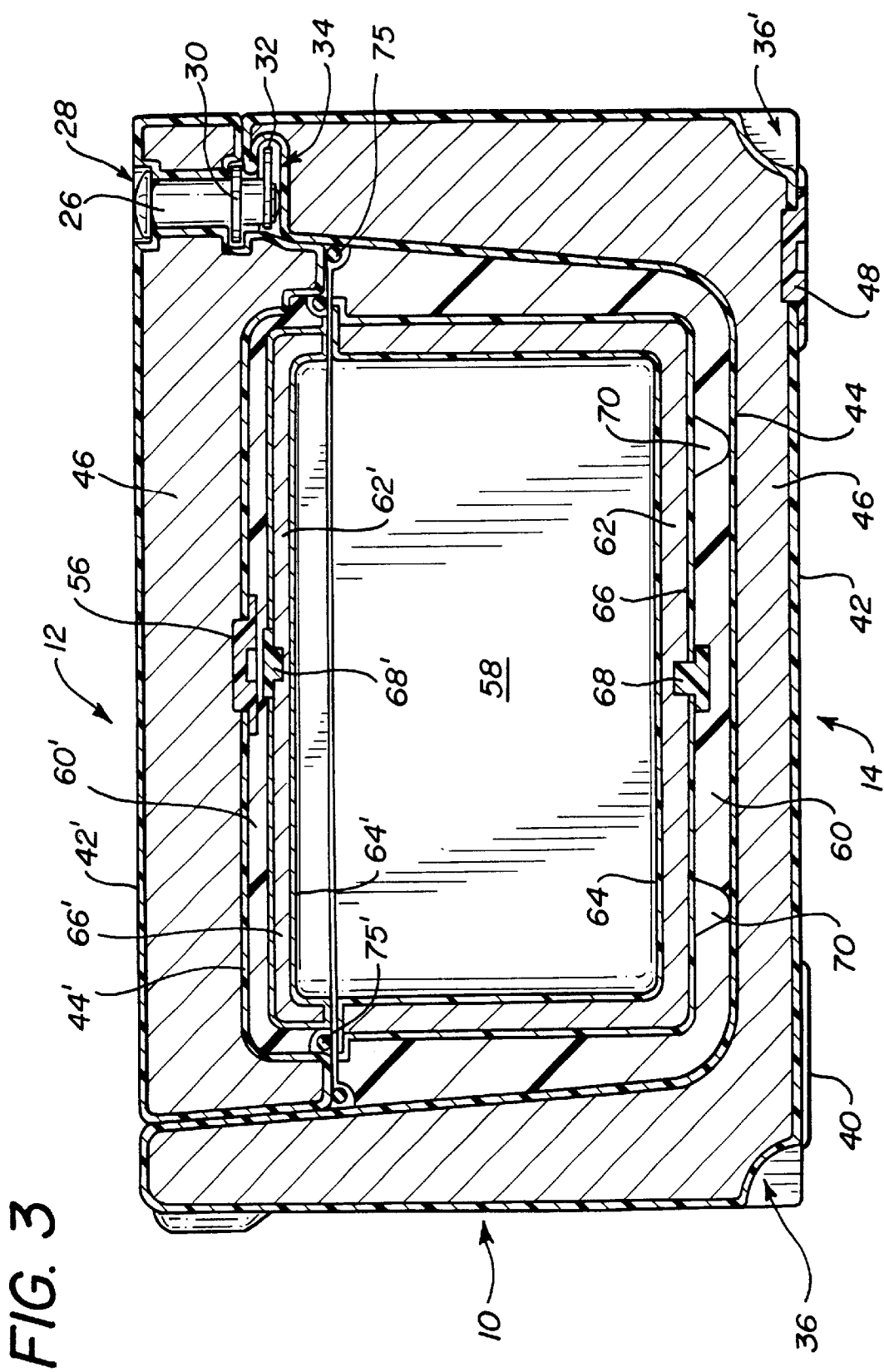

Referring now to the drawings, a first embodiment of a two piece fire-protection container 10 is shown in FIGS. 1–4 with the lid 12 and base 14 shown separately in FIGS. 1 and 2, respectively. Hinge pins 16, 16' are inserted through molded-in openings in rearwardly extending portions 18, 18' of lid 12. It is apparent that the protruding ends of pins 16, 16' will extend into molded-in blind holes 20, 20' in the raised central portion 22 of the back wall of base 14 if lid 12 is first placed in the proper orientation over base 14 before pins 16 are inserted. Conventional means, such as cementing pins 16, 16' to inside walls of openings 18 or 22, are employed to prevent easy withdrawal of the pins. Opposite the hinge side, lock 26 is inserted into molded-in thru-hole 28 in lid 12 and held in place by threaded nut 30. Latch 26 intersects with molded-in undercut 34 in base 14 when container 10 is in the locked state to prevent lid 12 from being opened. Molded-in finger holds 36, 36' in base 14 for lifting container 10 are also shown, along with molded-in finger slots 38, 38' for lifting and lowering lid 12. Molded-in raised portions 40 at the four corners of the bottom of base 14, one of which is seen in FIGS. 3 and 4, form feet for container 10.

Outer and inner plastic walls 42 and 44, respectively, are preferably roto-molded or blow-molded in predetermined configurations and continuously joined about their peripheries to cooperatively form a hollow shell. Layer 46 of silicate gel insulation is injected through a molded-in fill hole into the enclosed space between walls 42 and 44 such that it is completely enclosed and maintained under a water-tight seal. Layer 46, as previously described, comprises a mixture of water glass and salt of a polyvalent metal, preferably calcium chloride, and may also contain various inert fillers. Lid 12 also includes a hollow shell having outer and inner walls 42' and 44', respectively, filled with layer 46' of the same ceramic gel material.

Figure 8:
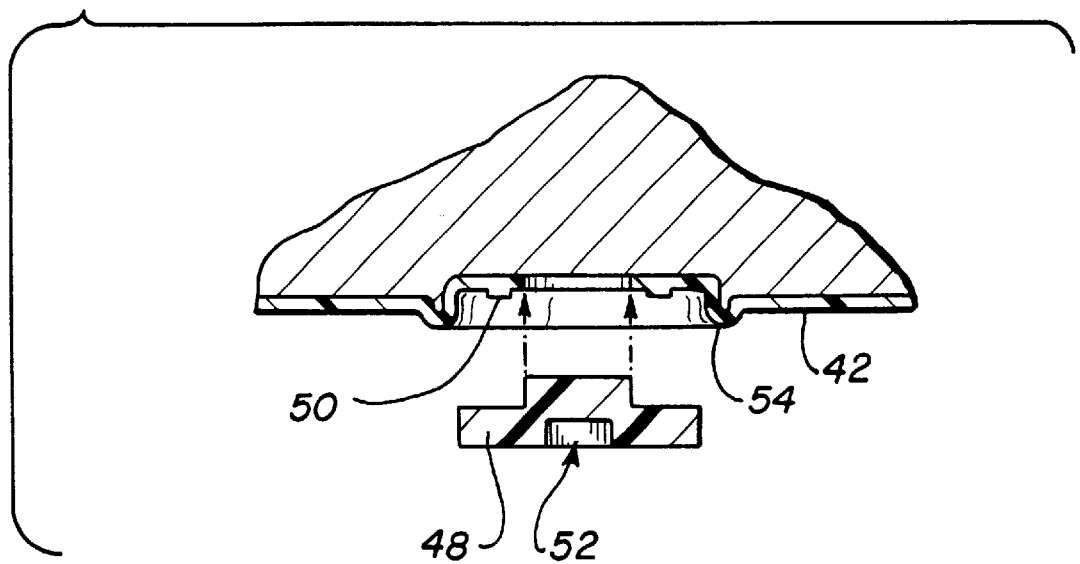
FIG. 8 is an enlarged, side elevational view, in section, of a portion of the container.

Fill plug 48 fits securely into the corresponding fill hole in wall 42 to form a physically secure and completely water-tight seal. Since blow-molded and roto-molded forms of container 10 will generally be made from polyethylene or polypropylene, plug 48 will preferably be of the same material as walls 42 and 44, attached by spin welding to form a homogenous and seamless bond between the outer shell wall 42 and the plug 48. As best seen in the enlarged fragment of FIG. 8, molded-in ring 50 surrounds the fill hole to facilitate the successful spinwelding of plug 48. A molded-in recess 52 in the plug 48 is engaged by a suitable rotary power tool to drive the plug. Ring 50 melts from the friction of plug 48 spinning against it at high rpm, thus permanently sealing plug 48 in place. It will be noted that the fill hole and ring 50 are provided in a recessed portion of wall 42 surrounded by molded-in ridge 54, in the same plane as feet 40. The hollow shell formed by walls 42' and 44' of lid 12 is sealed after filling in the same manner by plug 56.

From inspection of FIG. 3, it will be seen that when lid 12 and base 14 are in the closed or mated position, article storage space 58 is fully surrounded by layers 46, 46', i.e., by the novel ceramic gel materials encased in hollow shells with plastic walls. Upon exposure to high temperatures, e.g., above 1000 degrees F., the material of layers 46 and 46' will crystallize and harden to the state of a fired ceramic material. At least outer plastic walls 42, 42' will burn or melt away, and the heat absorbed by layers 46, 46' will protect the contents of storage space 58 up to about 220 degrees F. That is, the heat dissipating and insulating qualities of layers 46, 46' ensure that the temperature within space 58 does not exceed 220 degrees F. when container 10 is exposed to temperatures up to 1700 degrees F. for one hour.

Although the most basic form of container 10 may include only layers of the novel ceramic gel material in surrounding relation to the storage space, the invention contemplates the addition of further insulating layers for applications requiring protection at lower temperatures. For example, by keeping the temperature inside storage space 58 below 125 degrees F., container 10 will adequately protect electronic media such as magnetic storage disks and tapes, optical compact disks, and the like.

For such applications, layers 60 and 60' are provided immediately inside the walls enclosing layers 46 and 46', respectively, of base 14 and lid 12. Layers 60 and 60' are low density plastics, such as expanded polystyrene, foamed polyurethane or polyethylene, or other such conventional insulating materials. These may be separately molded and solidified in the desired configurations and simply placed in covering relation to inner wall 44, 44' of the gel layer shell. Alternatively, layers 60 and 60' may be formed in place, as explained in the following paragraph.

For enhanced protection of the stored material, an additional protective layer is provided, within layers 60 and 60'. The inner protective layers 62 and 62' of base 14 and lid 12, respectively, are a material with a melting point between about 100 and 125 degrees F. which change between solid and liquid phases with a high heat of fusion, e.g., at least 250 joules per gram. The material of layers 62, 62' is prepared in a flowable state and injected through fill holes into preformed, hollow plastic shells having inner walls 64, 64' and outer walls 66, 66', essentially the same as the ceramic gel layers and their plastic shells. The fill holes are also sealed in the same manner by spin-welled plugs 68, 68'. If layers 60 and 60' are to be formed (expanded) in place, the required quantity of material (polystyrene, polyurethane, etc.) in liquid form is poured or otherwise placed upon plastic walls 44 and 44' (with these walls of both base and lid positioned upwardly, of course). Preformed inserts comprising layers 62 and 62' within their respective plastic shells are provided with feet 70 to maintain the inserts in properly spaced relation to walls 44 and 44' while the material of layers 60, 60' is formed and solidified in the space between the plastic shells of layers 46, 46' and 62, 62'.

The phase change material layers 62, 62' could be comprised of any number of hydrated salts, waxes, etc. that have high heats of fusion and melting points of somewhere between about 100 to 124 degrees F. The currently preferred material for layers 62, 62' is a mixture of around 32 parts (by weight) water, 16 parts water glass (30 to 40% solids), 40 parts sodium phosphate dibasic (anhydrous), and 40 parts sodium phosphate tribasic (dodecahydrate). These are mixed to form a slurry which is injected into the space within the plastic shells formed by walls 64, 64' and 66, 66'. The slurry releases a moderate amount of heat as it solidifies. This material melts at around 118 to 122 degrees F. with a very high heat of fusion. This particular material was also chosen because it is chemically stable even after several cycles of melting and cooling, unlike some other salts in which water separates from the hydrate after melting, thus leaving behind a lower hydrate with a much higher melting point. The recyclability of the novel phase change material of the present invention allows the product (container 10) to protect its contents indefinitely against repeated exposure to high ambient temperatures; i.e., very high room temperatures of 140 degrees F. or more which could be caused by direct exposure to sunlight in a closed area, for example, without compromising the integrity of the phase change layers 62, 62'. This material property is also very important for transportation of the product, where it may spend many hours on a loading dock or inside a freight car in the hot sun. Ambient temperatures as high as 175 degrees F. are possible under these conditions.

Also note that either or both layers 60, 60' and 62, 62', i.e., the plastic insulation and phase change material, respectively, could optionally be comprised of a mixture of closed cell plastic foam granules (.e., polystyrene, polypropylene, or polyurethane) in a matrix of the phase change material; or granules of phase change material in a matrix of polyurethane foam. In either case, the granules sizes would preferably be on the order of 1/16" to 1/4" in diameter and the volumetric ratio between the foam and phase change material would preferably be around 2:1.

Another preferred feature of the design is a resilient, flexible, preferably neoprene foam seal 75, 75' which extend about the mating peripheries of lid 12 and base 14, respectively. Seals 75, 75' can be secured into place by gluing or other means. This double seal provides excellent protection against water, dust, and smoke both before and during a fire.

The invention further addresses certain structural enhancements to the outer plastic shell. For example, FIGS. 5 and 5A illustrate a further novel enhancement to the outer plastic walls 42, 42' of lid 12 and base 14 in which either or both shells are individually blow-molded or roto-molded over a preformed (preferably stamped from a single sheet) metal layer 80 which is conformal to the inside of the mold, or actually forms part of the mold, in the case of roto-molding, thus forming a metal/plastic laminate shell in a single step. The plastic shells totally enclose the silicate gel insulation while the outer metal layer 80 provides structural reinforcement and also optional hard attachment points for hinges, latches, and other hardware (not shown). Slots, holes, and other openings 82 are cut or punched when the metal layer 80 is being preformed/stamped, prior to the plastic molding step. Openings 80 can be provided for weight reduction, aesthetics, escape points for steam and vaporized plastic during fire exposure, or other practical purposes. It can be seen in FIG. 5A from the nature of the blow-molding process that the plastic will flow into the openings 82 and against the mold wall 84 to create a smooth surface at all of the hole edges. This provides the added benefit of anchoring the metal layer firmly in place. It is obvious that the metal shell can be provided in almost any gauge to provide the desired level of protection. As such, this design could be used to produce a container with sufficient structural integrity to meet the most rigorous standards of the industry, including the 30 ft drop test following the burn test.

Figure 6:
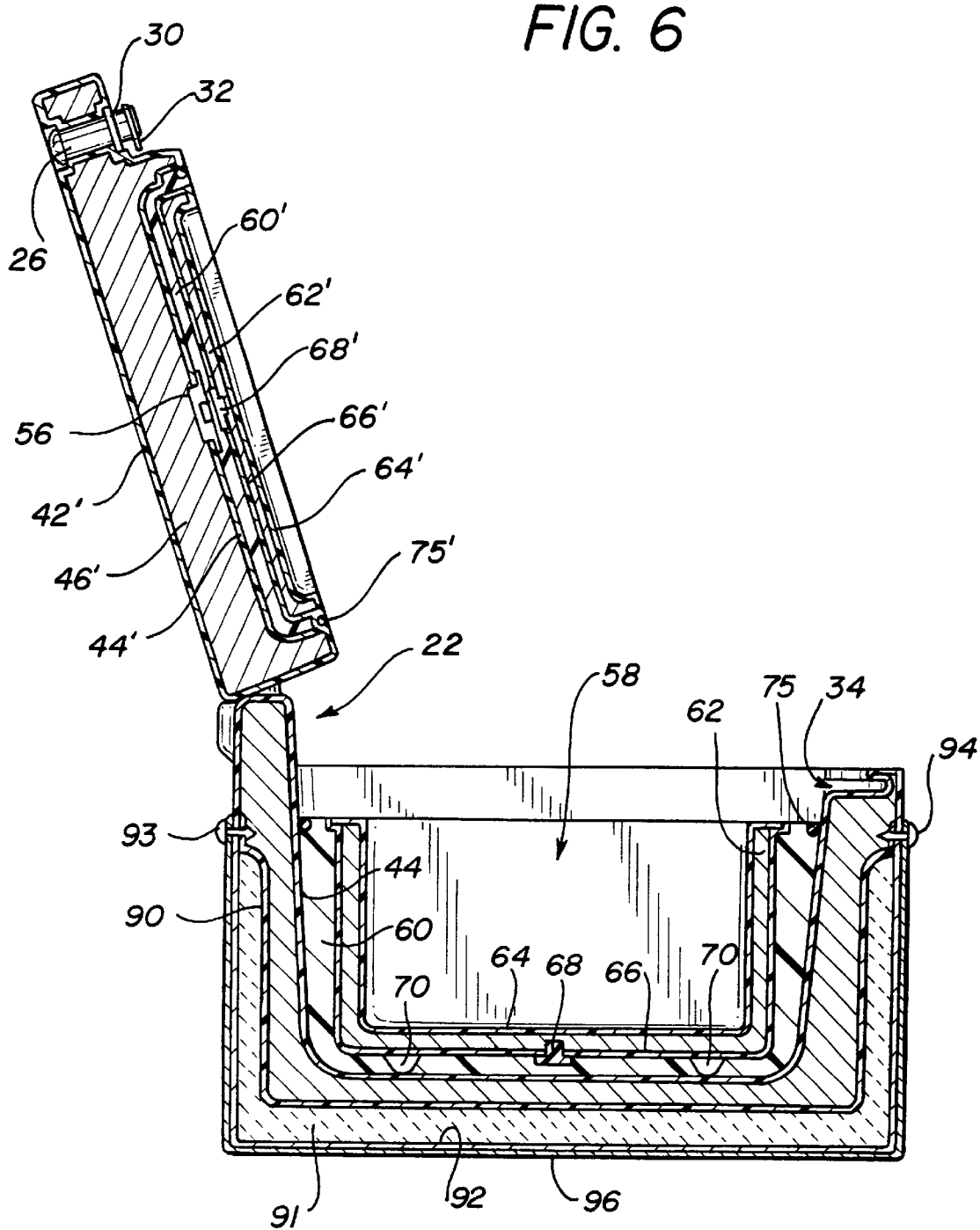
FIG. 6 is a side elevational view, in section through the longitudinal, vertical centerline, of another embodiment of the container.

FIG. 6 shows an embodiment of container 10 in which the outer plastic shell wall 90 is indented to create a space to include ceramic fiber blanket 91 covered by metal shell 92. Fasteners such as screws/rivets 93 and 94 can be used to secure the metal shell 92 to the outer plastic shell wall 90. Also shown in FIG. 6 is a coating of intumescent material 96 on the outside surface of metal shell 92. The nature and function of material 96 are as previously explained.

Figure 7:
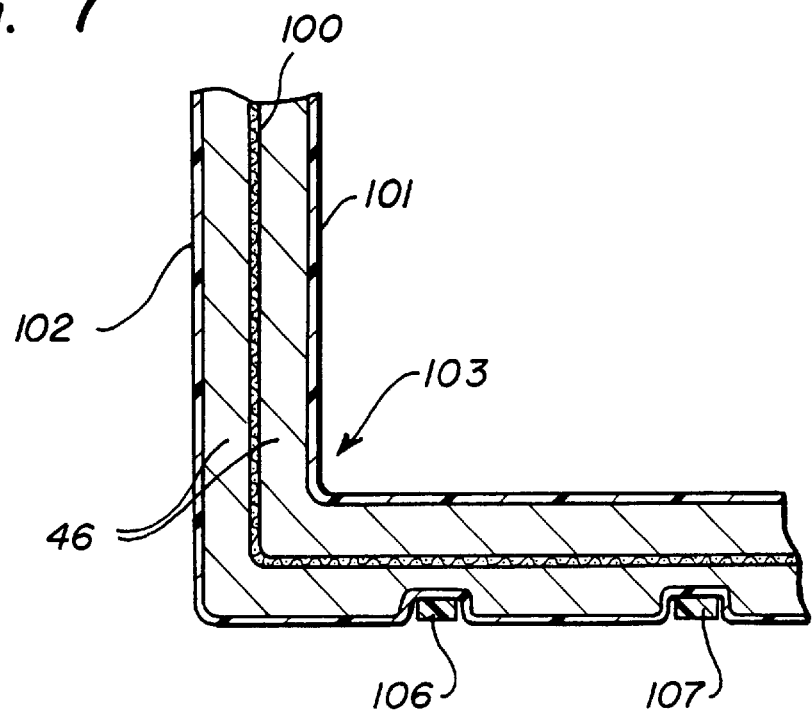
FIG. 7 is a fragmentary, side elevational view, in section, illustrating an additional, optional modification of the container structure.

Finally, in FIG. 7 a segment of perforated metal or wire mesh 100 is seen suspended between the inner wall 101 and outer wall 102 of the roto-molded shell section 103. The metal segment 100 is held in place between the mold walls during roto-molding by suitable fixed supports within the mold. Holes in the plastic shell wall 102, created at the points where supports extend through the shell wall during molding are sealed off via spin welded plugs 106 and 107 after the molding has been completed, and before any silicate gel is injected into the shell wall. Note that due to the possible corrosive effect of the silicate gel material, it may be desirable to first galvanize or plastic coat the metal segment 100 before molding it into the shell 103.

Figure 9:
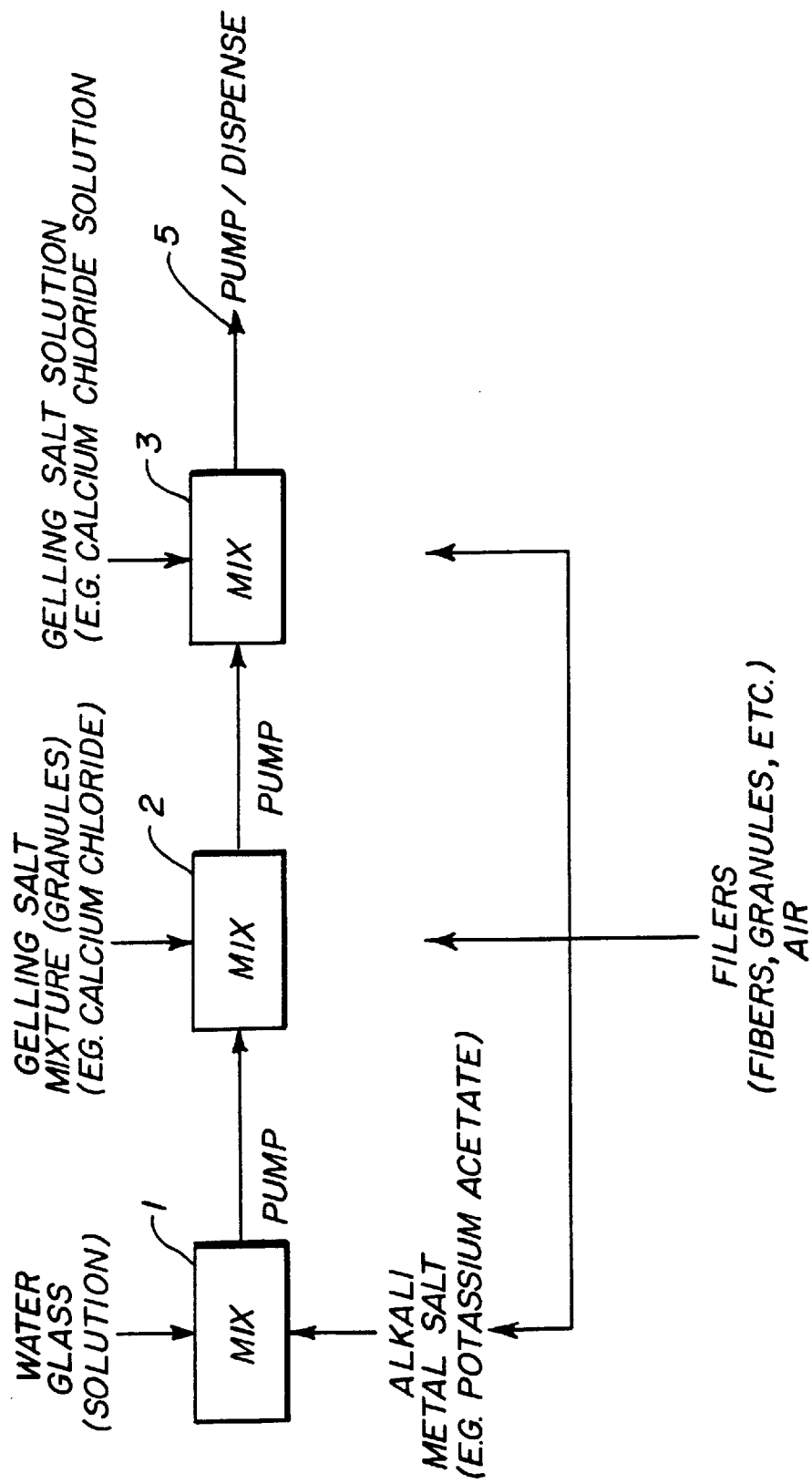
FIG. 9 is a functional diagram of a proposed dispensing system for injection of the silicate gel insulation into the plastic shell of the container.

The general process for mixing and dispensing the silicate gel insulation is shown in FIG. 9. Here is can be seen that first, a small quantity of alkali metal (sodium or potassium) salt is optionally mixed in with the water glass at 1. A preferred amount would be about 80 ml of saturated potassium acetate solution per 14 lbs water glass (solution with 30 to 40% solids; silica to metal oxide ratio of about 2 to 4, preferably about 3 to 3.5). The gelling salt is now added in granular form at 2 in a ratio of about 1.5 to 2.5 lbs per 14 lbs water glass. The preferred gelling salt at the present time is calcium chloride dihydrate having a granule size of around 1 to 6 millimeters (in any given dimension). A solution (typically at or close to saturation) of a gelling solution (i.e., calcium chloride) can be optionally mixed into the resulting slurry at 3 as it is being dispensed from the mixing/dispensing apparatus 5. The presently preferred amount of saturated calcium chloride solution used is about 120 milliliters per 14 lbs water glass. The purpose of this final step is to facilitate rapid solidification of the gel as it flows into place inside the walls of the plastic shell. Thus, it begins to solidify within several seconds instead of several minutes, thus preventing the gelling salt (calcium chloride) granules from settling out of the water glass solution before reacting fully to form a homogenous gel. This becomes more important when larger granule sizes are used, due to their slower reactivity.

From the foregoing, it can be seen that the invention provides a highly effective, fire-protection storage container which is both light-weight and inexpensive while also having the eminently desirable feature of maintaining its structural integrity after long duration fire exposure with temperatures in the range of 1200 to 2000 degrees F. or higher. This is due to the fact that the invention employs ceramic-based materials instead of the standard prior art methods of using cementitious materials as the primary high temperature insulation layer. The following specific examples are provided to illustrate the invention, but are not intended to be all-inclusive of product implementations within the scope of the invention.

EXAMPLE 1

First consider two roto-molded hollow, plastic shell portions comprising the base and lid of a container with external dimensions (body and cover mated together) of approximately 11 inches wide by 17 inches long by 10 to 11 inches high, and internal storage space of about 9 inches wide by 14 inches long by 9 to 10 inches high. Inject ceramic gel insulation into each shell portion, allow to set, drain off any excess water via fill hole, then securely plug via spin welding. The ceramic gel mixture is preferably comprised of a commercial grade of 36 to 40% (solids) solution of water glass with a silica to metal oxide ratio of about 3.2 (ie. Occidental Chemical Grade 40 water glass), potassium acetate solution, calcium chloride granules or flakes (size from about 2 to 5 millimeters), and calcium chloride solution. First, mix about 42 lbs water glass with about 240 milliliters of saturated potassium acetate solution; then mix in about 6 lbs calcium chloride granules; finally, mix in a total of 360 milliliters of saturated calcium chloride solution via metering pump to the above slurry as it is being dispensed into the plastic shell. When the lid is hingedly attached to the base and in the closed position, the storage space is completely surrounded by the two plastic shells and thus by a later of the ceramic gel material. This container is intended to provide fire and heat protection for paper and similar articles, and have a fire endurance rating of at least 1 hr using tests based on accepted industry standards.

EXAMPLE 2

Consider now the container of EXAMPLE 1 with the following additions to provide protection for more heat-sensitive articles such as floppy disks and optical cds. Starting with the container of Example 1 add a layer of premolded or formed in place polyurethane or possibly polystyrene which fits closely to the inside of the plastic shells holding the ceramic gel layers of both the lid and the base. Prepare a second pair of hollow, plastic shell portions configured to fit snugly within the polyurethane or polystyrene layers of the lid and base. Fill each shell portion with a phase change material in flowable form, formulated as previously described. Seal the fill holes with spin-welded plugs. The storage space of the closed container is now completely surrounded by three protective layers. This product should likewise provide 1 hr fire protection for magnetic and optical data storage media and the like according to established industry standards.

EXAMPLE 3

Consider the container of EXAMPLE 1 or 2 using the following materials and ratios to form the ceramic gel mixture. First, mix in 300 ml of saturated sodium chloride solution to 8 kg water glass. Next, add a sufficient quantity of foamed polypropylene granules and/or wood granules/particles in an amount which comprises up to about 20% of the final volume of the mixture; and/or blend in plastic, glass or ceramic fibers (fiber diameter 10 to 50 microns) to comprise between 1 to 5% by weight of the water glass. Then mix in 1000 grams of calcium chloride granules. continue to stir mixture rapidly until there is a significant viscosity increase, along with the appearance of a whitish color to the gel, and immediately inject the mixture into the preformed plastic shells of the base and lid.

What is claimed is:

1. A fire and heat resistant storage container comprising:
   (a) at least two body portions moveable relative to one another between a mutually mated position, wherein said body portions cooperatively define a fully closed position and a separated position, permitting physical access to said compartment,
   (b) each of said body portions including a first layer of protective material that completely surrounds said compartment when said body portions are in said closed position, said first layer of protective material comprising a ceramic gel composed primarily of a solution of sodium silicate or potassium silicate and a salt of a polyvalent metal in relative proportions of 8 Kg to between about 500 g and 1000 g respectively; and
   (c) each of said body portions further including a second layer of protective material inwardly of said first layer that completely surrounds said compartment when said body portions are in said closed position, said second layer of protective material comprising a mixture of water, water glass, sodium phosphate dibasic (anhydrous) and sodium phosphate tribasic (dodecahydrate).

2. The container of claim 1 wherein said sodium phosphate dibasic and tribasic are present in substantially equal parts.

3. The container of claim 2 wherein said second layer of protective material consists essentially of a mixture of about 32 parts water, 16 parts water glass (30 to 40 percent solids), 40 parts sodium phosphate dibasic (anhydrous) and 40 parts sodium phosphate tribasic (dodecahydrate), all of said parts being by weight.

* * * * *

UNITED STATES PATENT AND TRADEMARK OFFICE
CERTIFICATE OF CORRECTION

PATENT NO.     : 6,686,003 B2
DATED          : February 3, 2004
INVENTOR(S)    : David J. Legare It is certified that error appears in the above-identified patent and that said Letters Patent is hereby corrected as shown below:

<u>Title page,</u>
Item [73], Assignee, after "New Albany" please delete "NY" and substitute therefor
-- IN --.

<u>Column 14,</u>
Lines 25-26, please delete "fully closed position" and substitute therefor
-- fully enclosed compartment --.

Signed and Sealed this

Fourth Day of May, 2004

JON W. DUDAS
*Acting Director of the United States Patent and Trademark Office*